H. M. BARRER.
MOTOR FOR ELECTRIC SHEARS.
APPLICATION FILED APR. 17, 1913.
1,112,884.
Patented Oct. 6, 1914.
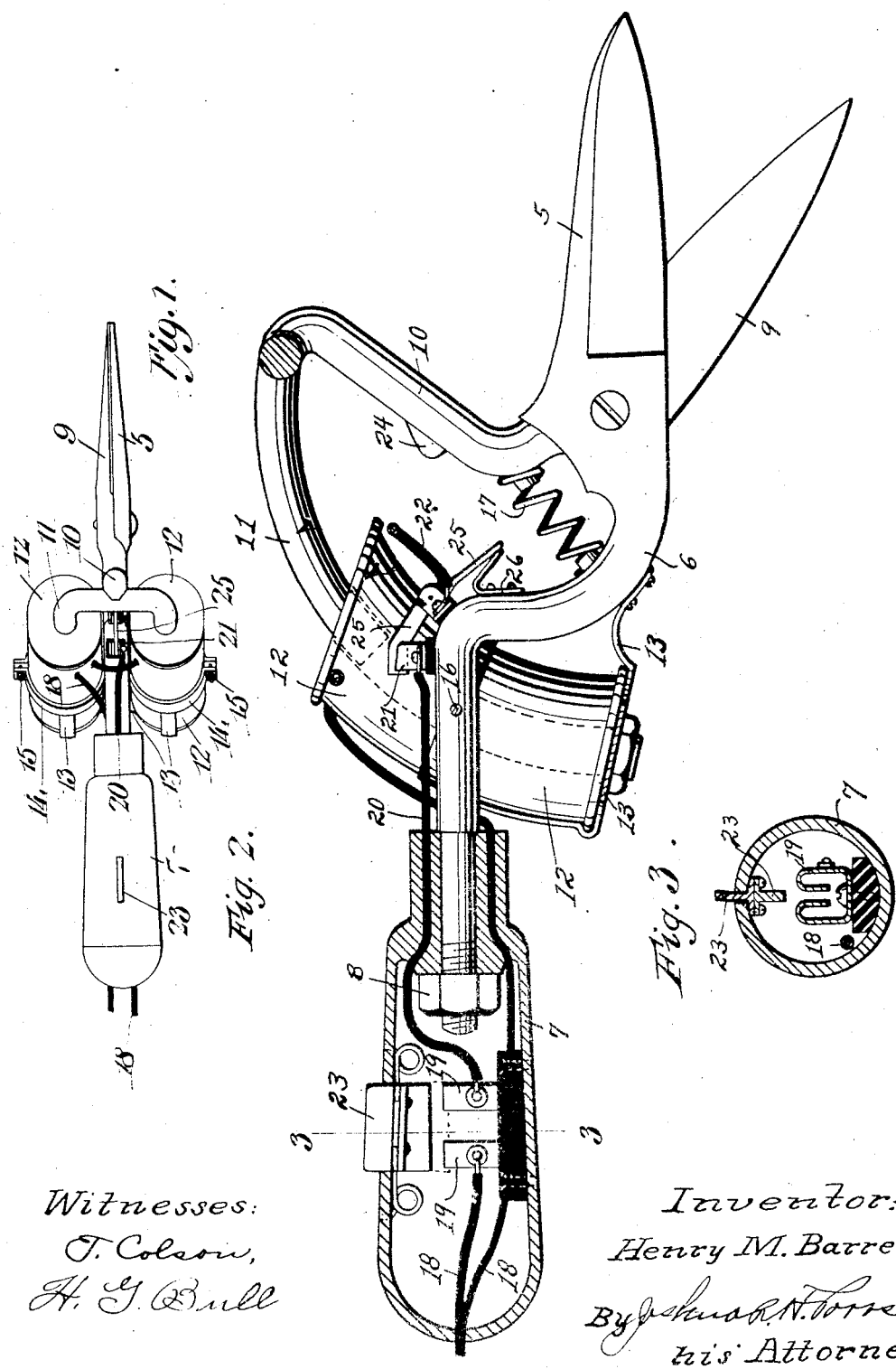
Witnesses:
T. Colson,
H. G. Bull
Inventor:
Henry M. Barrer,
By Joshua R. H. Potts
his Attorney.

UNITED STATES PATENT OFFICE.

HENRY M. BARKER, OF CHICAGO, ILLINOIS.

MOTOR FOR ELECTRIC SHEARS.

1,112,884.

Specification of Letters Patent.

Patented Oct. 8, 1914.

Application filed April 17, 1913. Serial No. 761,581.

*To all whom it may concern:*

Be it known that I, HENRY M. BARKER, a subject of the Czar of Russia, and a resident of the city of Chicago, county of Cook, and State of Illinois, have invented certain new and useful Improvements in Motors for Electric Shears, of which the following is a specification.

My invention relates to motors for electric shears or scissors and the object of this improvement is to provide simple and effective electrically operated shears of the character mentioned.

Other objects will appear hereinafter.

The invention consists in the combinations and arrangements of parts hereinafter described and claimed.

The invention will be best understood by reference to the accompanying drawings forming a part of this specification, and in which—

Figure 1 is a plan view of a pair of shears embodying my invention, Fig. 2 is a side elevation with portions removed to show other portions of the mechanism, and Fig. 3 is an enlarged transverse section taken on line 3—3 in Fig. 2.

The preferred form of construction as illustrated in the drawings comprises a stationary shear blade 5 and a stationary stem 6 to which is secured a handle 7 by means of a nut 8 threaded on the end of stem 6. A movable blade 9 is provided with a stem 10 which is bifurcated at its free end forming armatures 11 for solenoid coils 12. Said solenoid coils 12 are secured at their lower ends by means of a support 13 to the stem 6 and provided with clamping bands 14 at the central portion of said solenoids and bound together by means of bolts 15. A rivet 16 passes through the bands 14 and stem 6 to securely fasten the solenoids 12 to the stem 6. A compression spring 17 is inserted between the stems 6 and 10 of the shears to automatically open the shear blades 5 and 9 when the solenoids 12 are not acting on the armatures 11. Electrical conducting wires 18 enter the handle 7, one of said wires passing through said handle 7 and connected with one of solenoid coils 12. The other of the electrical conducting wires 18 enters the handle and is connected to the switch member 19 mounted therein. A conducting wire 20 connects the other of the stationary members 19 with the stationary member of the switch 21 and a short electrical conducting wire 22 connects the other member of the switch 21 with the other of the solenoids 12. The solenoids 12 are connected together in the usual manner to act in unison when an electrical current is passed through the solenoids. A movable switch member 23 is slidably mounted in the handle 7 in a manner to engage the stationary switch members 19 to close the circuit to permit a current to pass through the switch 21 and solenoids 12 to operate the device.

In operation, the operator presses downwardly on the switch member 23 to close the electric circuit in the device. The electrical current on passing through the solenoids 12 causes them to attract the armatures 11 thereby causing closing of the blades 5 and 9. As the shear blades are closed the tongue 24 on the stem 10 engages the arm 25 of the switch 21 which opens the switch 21 thereby opening the electric circuit through the device. As soon as the electric circuit is broken the solenoids 12 release the armatures 11 and the compression spring 17 again opens the blades 5 and 9 and as soon as the stem 10 has passed far enough away to permit the spring 26 to again close the switch arm 25 the electric circuit is again closed and the solenoids again attract the armatures 11 to cause the automatic operation of the device.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the kind described comprising a frame made up of two stems pivoted together; two clamping bands secured on opposite sides of one of said stems; a pair of solenoids clamped in said clamping bands; bifurcated portions on the other of said stems providing armatures coöperating with said solenoids; a compression spring between said stems; a circuit breaker on one of said stems and adapted to engage said other stem to cause operation of said stems; and an electric circuit including said solenoids and circuit breaker, substantially as described.

2. A device of the kind described comprising a frame made up of two stems pivoted together, one of said stems being stationary and the other adapted to oscillate; two clamping bands secured to opposite sides of said stationary stem; two solenoids clamped in said bands; a support secured to the ends of said solenoids and to said stationary stem; two branch portions on said oscillating stem providing armatures for said solenoids; a compression spring between said stems resiliently holding said blades in open condition; a spring pressed switch carried on one of said stems; a lug on the other of said stems adapted to engage and open said switch upon closing of said blades; and an electric circuit including said solenoids and said switch, substantially as described.

In testimony whereof I have signed my name to this specification in the presence of two subscribing witnesses.

HENRY M. BARRER.

Witnesses:
JOSHUA R. H. POTTS,
HELEN F. LILLIS.